July 26, 1938.  F. H. ROBY  2,124,795
WELDER CONTROL SYSTEM
Filed Jan. 25, 1937  3 Sheets-Sheet 1

Inventor
Frank H. Roby.
By Myron J. Seibold
Attorney

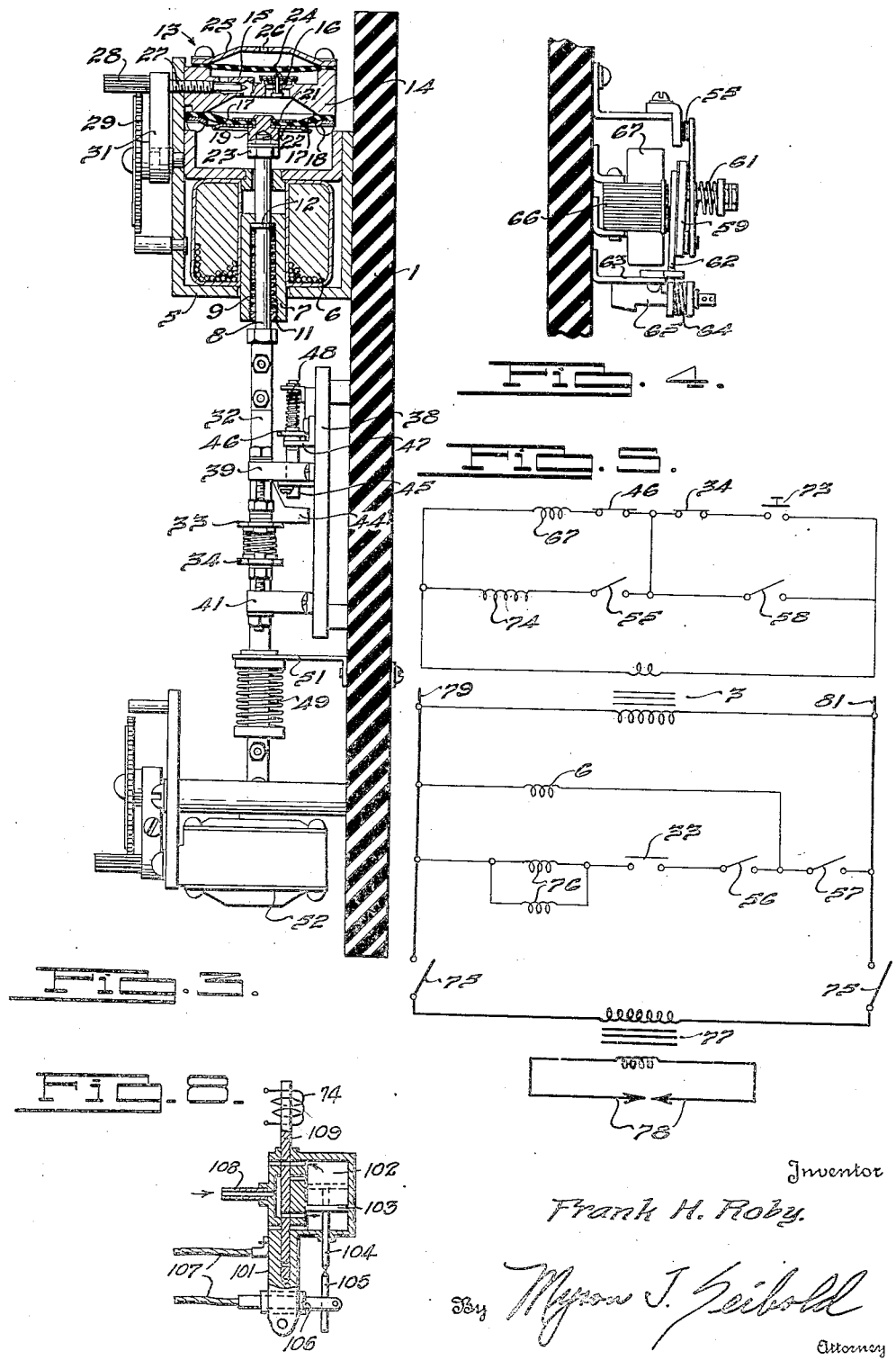

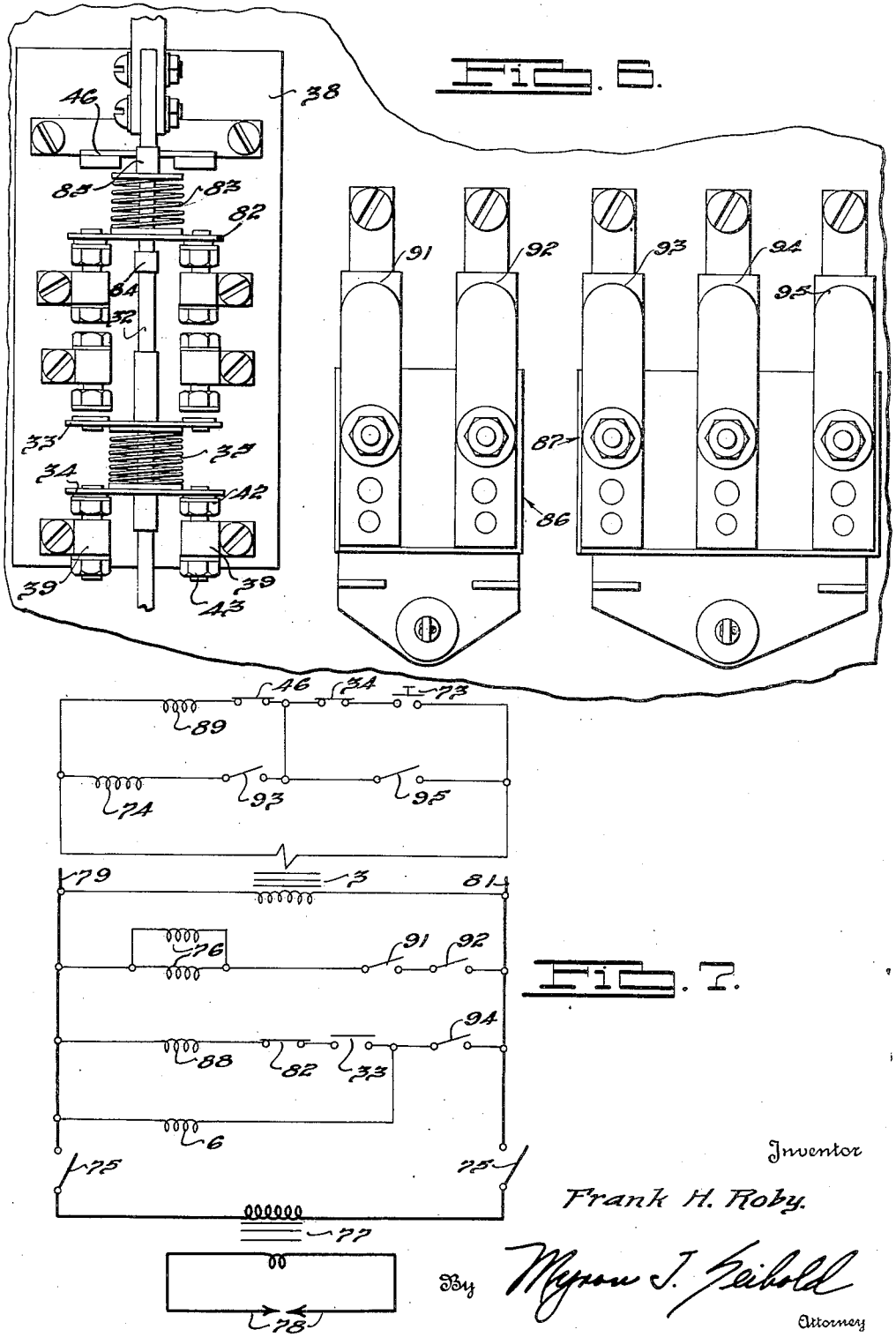

Patented July 26, 1938

2,124,795

UNITED STATES PATENT OFFICE 2,124,795

WELDER CONTROL SYSTEM

Frank H. Roby, Milwaukee, Wis., assignor to Square D Company, Detroit, Mich., a corporation of Michigan Application January 25, 1937, Serial No. 122,173

10 Claims. (Cl. 219—4)

This invention relates to a method of electrically welding material and to a control system incorporating the same and more particularly to a method and system of welder control in which the various control operations forming the separate periods in a welding cycle are carried out with a predetermined time delay.

One object of the present invention is an improved method of electrical welding in which each of the successive operative steps is performed with a predetermined time delay and independently of other variables.

Another object of the invention is to provide an automatic welder control system in which each of the operating periods in the welding cycle is controlled by a time delay.

Another object of the invention is to provide an electric welder control system including an adjustable timing relay operating a plurality of normally open and closed contacts to determine the pressure delay period, the welding period, and the off period and also the dwell period if one is desired.

Another object of the invention is to provide an electric welder control system in which the pressure delay period, the welding period, and the off period are under the control of a single electric timing relay.

Other objects and features of the invention will be readily apparent to those skilled in the art from the following specification and appended drawings illustrating certain preferred embodiments of the invention in which:

Figure 3 is a vertical sectional view on the line III—III of Figure 1.

Figure 4 is a partial vertical sectional view on the line IV—IV of Figure 1 showing a control relay in side elevation.

Figure 5 is a simplified wiring diagram of the control system.

Figure 6 is a partial front elevational view of a control panel adapted to supply a definite dwell period.

Figure 7 is a simplified wiring diagram of the control system employing the panel form of Figure 6 and incorporating a definite dwell time.

Figure 8 is a generally diagrammatic view showing the operating parts of a welder machine to which the controlling method and means may be applied.

Figures 1, 2:
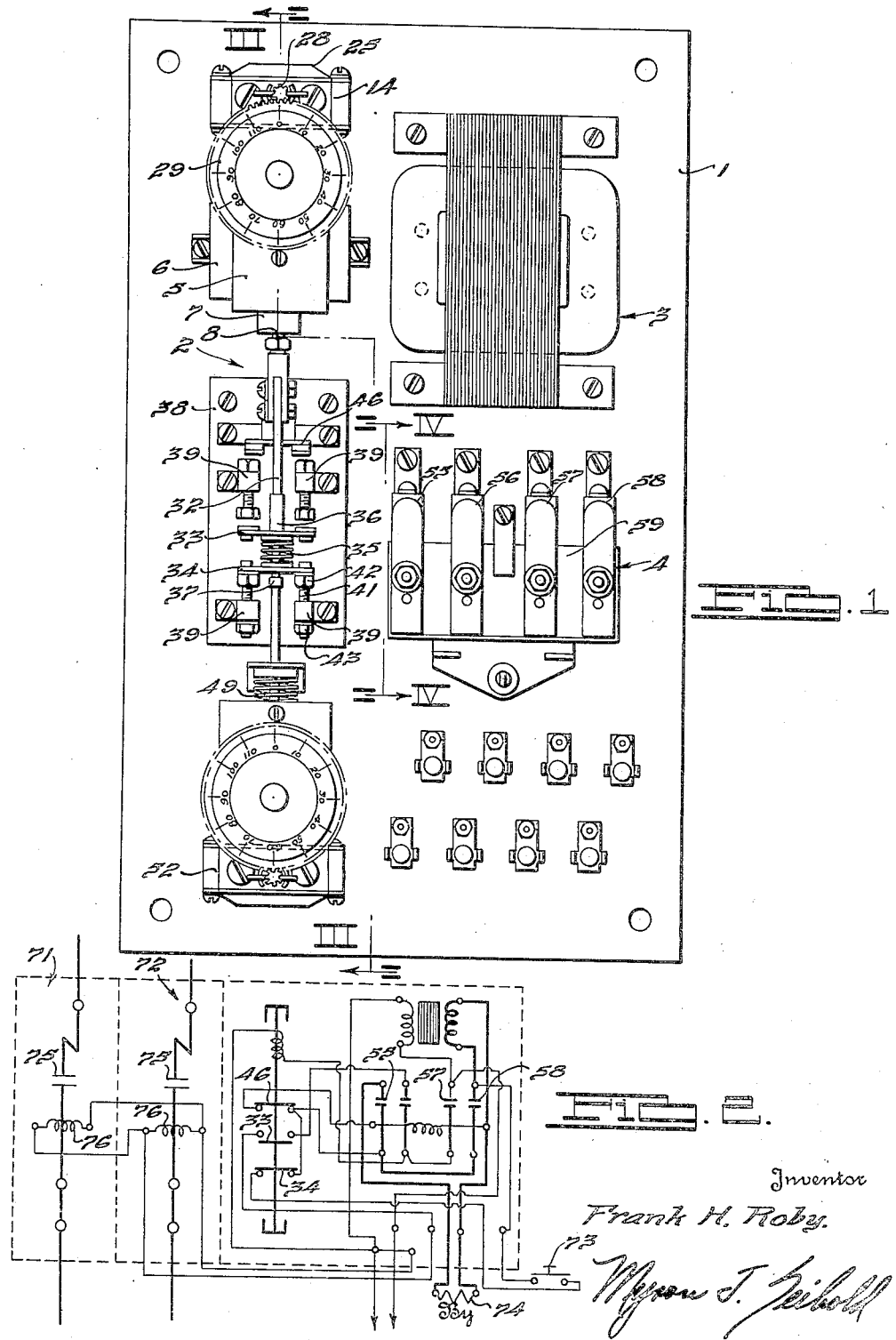
Figure 1 is a front elevational view of a control panel according to the present invention.
Figure 2 is a schematic wiring diagram of the welder control system.

The control panel according to the present invention provides a mounting panel 1 having thereon a timing relay 2, a step-down transformer 3 and a control relay 4. The timing relay 2 includes a supporting frame 5 of magnetic material within which is mounted an operating coil 6 surrounding a solenoid core 7. The core 7 is hollow and slidably receives a rod 8 and a compression spring 9 disposed therearound. The spring 9 is disposed between a closing nut 11 threaded into core 7 and a flange 12 rigid with the rod 8. On the upper part of the frame 5 is disposed a timing chamber 13 comprising a central dividing portion 14 having disposed therein a needle valve 15 and a check valve 16. The dividing portion 14 is of general double cup shape and to its bottom portion a flexible diaphragm 17 is sealably connected as by means of a rigid metallic member 18. A nut 19 is secured to the diaphragm 17 by being riveted through opposite disc washers 21 and 22 as shown. The rod 8 is threaded into the nut 19 and is maintained in place by a locking nut 23. A flexible diaphragm 24 is connected to the upper edge of the double cup member 14 by means of a rigid shielding member 25 having a relatively large opening 26 leading to the external air. The needle valve 15 includes a longitudinally adjustable pin 27 provided with gear teeth at its exterior portion 28 meshing with a large indicating gear wheel 29. A split spring pressed double bushing 31 holds the valve in its adjusted position. This time delay means is more particularly shown and described in the co-pending application of Henry A. Wilhelm, Serial No. 110,724, filed November 13, 1936. To the lower end of the rod 8 is secured a rigid insulating member 32 having slidably supported thereon bridging contact elements 33 and 34 biased in separated position by compression spring 35 and limited in their movement by stops 36 and 37 on the member 32. The cooperating stationary contacts are mounted on a plate 38 mounted on the back plate 1 and comprise forwardly projecting conducting portions 39 in which are threaded the supporting stems 41 of the stationary contacts 42 and locked in adjusted position by locking nuts 43. The member 32 is provided with a striker portion 44 adapted to engage a pin 45 on which is mounted a bridging contact element 46 and biased into contact engaging position with stationary contacts 47 on the plate 38 by means of a compression spring 48. A compression spring 49 interposed between a stationary bracket 51 and a part on the member 32 biases the member and its associated parts in the downward direction. A time delay element 52 identical in construction with the time delay element 13 previously described is attached to the lower end of the member 32 and serves to delay its movement in the opposite direction.

The operation of this relay will now be described. When the operating coil 6 is energized, the solenoid core 7 is immediately drawn into its interior position thus compressing spring 9 and applying its bias to the rod 8 and to the member 32. The upward movement of the member is, however, delayed under the control of the timing element 52. As the member 32 moves upwardly under the control of the timing element 52 the stop 37 first engages the bridging contact element 34 and breaks the circuit associated therewith. Thereafter the contact element 33 comes into engagement with its associated stationary contacts and completes the circuit therethrough. With a continued upward movement of the element 32 the striker 44 engages the pin 45 and moves the bridging contact element 46 into the disengaged position to break its associated circuit. When the circuit, through the operating coil 6 is broken, the member 32 and associated parts will move downwardly under the action of gravity and the compression spring 49 and this movement will be under the control of the timing element 13 and will be adjustable by the adjustment of the needle valve 15. In this downward movement the striker 44 will first permit the circuit associated with the contact element 46 to close and will thereafter open the circuit associated with contact element 33 and then close the circuit associated with contact element 34 thus placing the parts in their original position. It is to be noted that the timing element 13 provides for dash-up movement by passage of the interior fluid through the check valve 16 and for delayed downward movement by the controlled passage of the interior fluid through the needle valve 15. The timing element 52 is of the exact construction but reverse action and permits dash-down through a check valve and timed upward movement through its adjustable needle valve. The diaphragm 17 places the appropriate pressure or vacuum on the fluid within its chamber to secure movement of the fluid from its associated chamber through the valves and the diaphragm 24 is an idle diaphragm which acts as a reservoir for this fluid and serves to seal off the valves from the exterior air, all as more fully explained in the aforesaid co-pending application. The control relay 4 as more particularly shown in Figures 1 and 4 comprises a plurality of cooperating sets of contacts 55, 56, 57 and 58 having their movable contact finger portions mounted on an insulating plate 59 and biased thereagainst by a compression spring 61 serving to maintain contact pressure. Plate 59 is mounted on the magnetic armature member 62 pivotally mounted on a bracket 63 and biased to open position by a compression spring 64 mounted on a pin 65. For operating the armature there is provided a stationary magnet structure 66 energized by an operating coil 67. The operation of the control relay is readily apparent as energization of the coil 67 causes the attraction of the armature 62 to the stationary magnet 66 and the closing of the cooperating contacts 55, 56, 57 and 58 while deenergization of the coil 67 operates to separate the contacts under the action of gravity and biasing spring 64.

Figure 2 illustrates the wiring of the control panel shown in Figure 1 in conjunction with electromagnetically operable welder contactors 71 and 72, a controlling push button 73 and a solenoid 74 actuating the valve controlling the admission of air to the cylinder controlling the pressure exerted on the welder electrodes. The contactors 71 and 72 include cooperating contacts 75 operable to closed circuit position by energizing coil 76 to supply the welding current through the weld. The contacts 75 are connected in the legs leading to the primary winding of the welding transformer. The push button 73 is of the normally open type. The solenoid 74 and its associated valve may be located at any point but for high speed operation is preferably mounted on the welding tool as is also the push button 73 to facilitate control by the operator. The wiring diagram of Figure 2 is shown in simplified form in Figure 5 wherein is now schematically shown the welding transformer 77 and the welding electrodes 78. The operation of this system will be explained in connection with the simplified wiring diagram of Figure 5. The power supply lines may be here designated at 79 and 81. Upon the closing of the push button 73 the operating coil 67 of the control relay 4 will be energized through the normally closed contacts 34 and 46. The control relay 4 will now close and will maintain itself closed through normally closed contact 46 and its own contact 58. The valve solenoid 74 is now energized through contacts 55 and 58 and admits air pressure to the cylinder applying pressure to the welder electrodes. The operating coil 6 on the timing relay is also energized through contact 57. This results in the drawing up of the armature core 7 and the applying of the bias of spring 9 on the rod 8 as a result of which the member 32 moves upwardly under the control of the timing element 52. The member 32 in its upward movement first disengages the circuit through the contact element 34 and disconnects the push button 73 from the control circuit of the control relay 4. However, the control relay remains in closed position due to the circuit through contact element 46 and the control relay contact 58. As the member 32 moves upwardly it now closes the circuit through the contact element 33 and energizes the coils 76 of the welder contactors 71 and 72 through contact element 33 and the control relay contacts 56 and 57, thus passing the welding current through the work. The member 32 continues to move upwardly until the striker 44 engages pin 45 to break the circuit through contact element 46. This breaks the circuit through the operating coil 67 of the control relay, thus opening all the contacts 55, 56, 57 and 58, thus opening the control circuits through the coils 6 and 76 and the valve solenoid 74, thus disconnecting the valve solenoid and the welder contactor to interrupt the welding current and to relieve the pressure on the welding electrodes. The solenoid core 7 now drops downwardly relieving the spring pressure on the rod 8 and the member 32 begins its downward travel under the control of the timing element 13. As the member 32 moves downwardly it successively closes the circuits through contact elements 46 and opens that through contact element 33 without energizing the control system. When the circuit is completed through contact element 34, however, the system is ready for another cycle and assuming that the operator has continued to hold down the push button 73 which initiated the previous cycle the operation will be automatically repeated and will continue to repeat so long as the push button is held closed.

The pressure delay time and the welding time are controlled by the time of upward movement of the member 32 and the off time is controlled by the time of downward movement and the time of upward and downward movement may be separately adjusted by the needle valves on the timing elements 13 and 52. Variation in the timing element 52 will, of course, change both the pressure delay time and the welding time but this can be regulated by adjusting the stationary contacts 42 by screwing their supporting stems 41 into or out of their supports 39. One manner of adjustment which will obviate the necessity of continually changing the stationary contact positions is to select a minimum pressure delay period by suitable positioning of the stationary contacts, which minimum period will insure the building up of the proper amount of pressure on the electrode before power is supplied and hence whenever the welding time is lengthened the pressure delay time will always be lengthened also so that a suitable welding pressure will always be obtained. Of course, to speed the operation of the device in case any large change in welding time is desired, the setting of the stationary contacts may be varied.

The timing relay and control system which has so far been described does not provide for any definite dwell period. This dwell feature is not required on all welder applications as in general some dwell is always obtained by virtue of the difference in the speed of operation between a high speed welder contactor and a characteristically sluggish air pressure cylinder. The chief opposition to the dwell period is that it necessarily slows down the rate at which welds can be made and for very high speed operation a definite period would not be desirable. For slower welding periods and particularly where heavier gauges of metal are to be welded it becomes desirable and is always advantageous to provide for a definite dwell period in the welding cycle. In Figure 6 the timing relay has been modified and the control relay changed to provide this feature. This has been accomplished in Figures 6 and 7 by the addition of a normally closed bridging contact element 82 biased by a spring 83 between stops 84 and 85 on the member 32 and adapted to cooperate in bridging relation with stationary contacts mounted on the plate 36 and similar to those previously described. The distance separating the stop 84 from the contact element 82 is so regulated as to cause opening of the contacts at a definite interval after the closing of the circuit through contact element 33 and before the opening of the circuit through the contact element 46. The single control relay 4 had been replaced by two control relays 86 and 87 of identical construction with the exception of the number of sets of cooperating contacts. The control relay 86 has two cooperating sets of contacts 91 and 92 and the control relay 87 has three sets of cooperating contacts 93, 94 and 95. The control relay 86 is actuated to closed circuit position by the energization of coil 88 shown in the wiring diagram of Figure 7 and corresponding to the coil 67 of control relay 4. Similarly, the control relay 87 has an operating coil 89 also shown in the wiring diagram Figure 7. Figure 7 shows the simplified wiring diagram for a control system according to the present invention incorporating a definite dwell period in the cycle utilizing the timing relay and control relays of Figure 6. The cycle is again initiated by closing the push button 73. This energizes the operating coil 89 and the control relay 87 through the normally closed contact elements 46 and 34 whereupon relay 87 closes and maintains itself closed through its cooperating contacts 95. As relay 87 closes it energizes the valve solenoid 74 through its contacts 93 and 95. Also in closing the relay 87 energizes the operating coil 6 of the timing relay through its cooperating contacts 94. The core 7 is immediately drawn upward, thus placing the spring bias on the element 32 and causing it to move upwardly under the control of the timing element 52. As the bar moves upwardly it first opens the circuit through contact element 34 thus disconnecting push button 73 from the circuit. The additional upward movement of the bar closes the circuit through the contact element 33 which through contacts 82 and 94 energizes the operating coil 88 of control relay 86 and the closing of the relay 86 energizes the operating coils 76 of the welder contactors 71 and 72 through its contacts 91 and 92. This effects closing of welder contactor contacts 75, thereby passing current through the weld. Continued upward movement of the member 32 opens the circuit through the contact element 82 and hence deenergizes the operating coil 88 of the control relay 86 which now drops out and opens the circuit through the operating coils of the welder contactors which consequently open to interrupt the current through the weld. With continued movement of the member 32 the circuit is broken through the contact element 46 which deenergizes the operating coil 89 of the control relay 87 and causes it to drop open, thus deenergizing the valve solenoid 74 and the timing relay coil 6 whereupon the member 32 starts its downward movement under the control of the timing element 13 and when it finally has reached a position to close the circuit through contact element 34 the cycle is ready for repeat and will automatically continue so long as the push button 73 remains depressed. It is to be noted that the control relay 86 could be omitted if the design of contact elements 33 and 82 were such as to permit them to carry the relatively heavy operating current for the control circuits of the welder contactors. As it is desired to keep the timing relay contacts of relatively low capacity in order to secure longer life and improved operation the use of the control relay 86 is preferred to handle the current required by the welder contactor control circuit. In the system which has just been described, it is noted that the period between the opening of the circuit through the contact element 82 and the opening of the circuit through the contact element 46 constitutes the dwell period since when the circuit through contact 82 is opened the welding current will be interrupted but the pressure upon the welding electrodes will still be maintained as the valve solenoid 74 is still energized and this pressure will be maintained on the weld until contact 46 is opened to deenergize the solenoid valve and initiate the off period of the cycle.

Figure 8 illustrates a conventional type of welding machine in diagrammatic form to which the method and control means of the present invention may be applied. This includes a frame 101 which supports a cylinder 102 in which is disposed a piston 103 connected to a movable electrode 104. A cooperating electrode 105 is mounted on the lower part of the frame and insulated therefrom by an insulating sleeve 106. Leads 107 are connected to the secondary of the welding transformer to energize the electrodes 104 and 105. A fluid pressure inlet 108 is indicated for connection to any suitable source of fluid pressure, preferably compressed air, which is used to actuate the piston 103 within the cylinder 102. The valve is shown in the frame 101 and includes a movable valve portion 109 adapted to be moved by the solenoid coil 74. The position of the parts illustrated in Figure 8 is at the conclusion of a hold time in which the coil 74 has just been deenergized thereby allowing the valve portion 109 to move downwardly and connect the inlet port on the under side of the piston 103 with the source of fluid pressure. The force is now exerted tending to move the upper electrode to separated position into the dotted line position of the piston as shown.

To move the electrode to apply pressure to the work the coil 74 is energized moving the valve portion 109 upwardly and connecting the port on the upward side of the piston with the source of fluid pressure, thus moving the electrode downwardly into engagement with the work. The structure illustrated in Figure 8 is entirely conventional and is shown herein simply to illustrate one type of welding machine to which the method and control system of applicant's invention is applicable.

The low voltage control circuit transformer 3 is used to step-down the voltage of the source and supplies the circuits which lead to the welder tool or are otherwise within reach of the operator in order to supply low voltage to these parts and remove the hazard of high voltage to the operator.

Another feature of applicant's invention lies in its non-beat characteristic in that it is readily seen that once a weld has been started by the depression of push button 73 the cycle automatically continues and it is impossible for the operator to open the welder electrodes until the weld has been completed.

It is to be noted that the pressure delay period which is provided for the building up of pressure by the welding electrodes upon the work to be welded before the initiating of the current through the weld is purely a time delay and eliminates the use of a pressure switch such as is now common practice in initiating the welding current. This eliminates the possibility of burning both the work and the electrodes because of closing of a pressure switch prematurely due to turbulent air conditions. The elimination of this switch also reduces the cost of installation and reduces the possibility of failure in the completed control system.

While certain preferred embodiments of the invention have been specifically disclosed, it is understood that the invention is not limited thereto as many variations will be readily apparent to those skilled in the art and the invention is to be given its broadest interpretation within the terms of the following claims.

What is claimed is:

1. In a welder control system for electrically welding work by passing current therethrough between electrodes pressed against the work by fluid pressure, an electromagnetically operated valve controlling the application of fluid pressure to the electrodes, electromagnetic contactors controlling the passage of current through the work, a control relay, a time delay relay, means energizing said control relay, means energizing said electromagnetic valve and time delay relay when said control relay is energized, said time delay relay energizing said electromagnetic contactors a predetermined time interval after its own energization, said time delay relay deenergizing said control relay after another predetermined time interval to effect deenergization of the electromagnetic contactors, electromagnetic valve and time delay relay.

2. In a welder control system including fluid pressure operated welder electrodes, and electromagnetically operated valve controlling the application of fluid pressure to said electrodes, electromagnetic contactors controlling the passage of welding current through said electrodes, a normally open switch, a control relay, a time delay relay, means energizing said control relay when said switch is closed, means energizing said electromagnetic valve and time delay relay when said control relay is energized, means opening the circuit to said switch, said control relay being energized through a maintaining circuit, means energizing said electromagnetic contactors after a predetermined time interval, and means opening said maintaining circuit to open the control relay and deenergize the electromagnetic valve, electromagnetic contactors and time delay relay.

3. In a welder control system including fluid pressure operated welder electrodes, an electromagnetically operated valve controlling the application of fluid pressure to said electrodes, electromagnetic contactors controlling the passage of welding current through said electrodes, a normally open switch, a control relay, a time delay relay having successively operable normally closed contacts, normally open contacts and normally closed contacts, means energizing said control relay through the first operated normally closed contacts when said switch is closed, said control relay having a maintaining circuit through the last operated normally closed contacts, means energizing said electromagnetic valve to initiate the welding pressure when said control relay is energized, means energizing said time delay relay when said control relay is energized, said time delay relay opening its first normally closed contacts to disconnect the control relay energizing circuit through the switch, said time delay relay after a predetermined time interval closing its normally open contacts to energize the electromagnetic contactors and pass current through the work, said time delay relay after another predetermined time interval opening its last normally closed contacts to open the maintaining circuit for and deenergize the control relay, deenergization of the control relay effecting deenergization of the electromagnetic contactors, the electromagnetic valve and the time delay relay, return movement of the time delay relay being effected with a predetermined time delay and reenergization of the control relay being prevented until the time delay relay recloses its first opened normally closed contacts.

4. In a welder control system for electrically welding work by passing current therethrough between electrodes pressed against the work by fluid pressure, an electromagnetically operated valve controlling the application of fluid pressure to the electrodes, electromagnetic contactors controlling the passage of current through the work, a control relay, a time delay relay, means energizing said control relay, means energizing said electromagnetic valve and time delay relay when said control relay is energized, said time delay relay effecting energization of said electromagnetic contactors a predetermined time interval after its own energization, said time delay relay effecting deenergization of said electromagnetic contactors after another predetermined time interval, said time delay relay deenergizing said control relay after a third predetermined time interval to effect deenergization of said electromagnetic valve and time delay relay.

5. In a welder control system for electrically welding work by passing current therethrough between electrodes pressed against the work by fluid pressure, an electromagnetically operated valve controlling the application of fluid pressure to the electrodes, electromagnetic contactors controlling the passage of current through the work, a pair of independent control relays, a time delay relay, means energizing one of said control relays, means energizing said electromagnetic valve and time delay relay when said one control relay is energized, said time delay relay energizing the other control relay a predetermined time interval after its own energization, means energizing said electromagnetic contactors when said other control relay is energized, said time delay relay deenergizing said other control relay after another predetermined time interval to deenergize said electromagnetic contactors, said time delay relay deenergizing said one control relay after a third predetermined time interval to effect deenergization of said electromagnetic valve and time delay relay.

6. In a welder control system, welding electrodes, fluid pressure responsive means for pressing said electrodes against the work, means initiating the supply of fluid pressure to said pressure responsive means, time delay means having its operating period determined independent of variations in the fluid pressure supply, and means energizing said electrodes to pass current through the work, said time delay means effecting operation of said energizing means a predetermined interval after the initiation of the supply of fluid pressure.

7. In a welder control system for electrically welding work by passing current therethrough between electrodes pressed against the work by fluid pressure, means initiating the application of fluid pressure, time delay means for effecting the energization of the electrodes to pass current through the work a predetermined time interval after the initiation of the fluid pressure, said time delay means determining said delay interval independent of variations in the fluid pressure supply, and means for thereafter deenergizing said electrodes and releasing the fluid pressure to complete the weld.

8. In a welder control system for electrically welding work by passing current between electrodes pressed against the work by fluid pressure, means controlling the application of fluid pressure to said electrodes, means for energizing and deenergizing said electrodes to control the passage of current through the work, and time delay means operating to provide a predetermined cycle for the operation of said means and including a delay period after initiation of the fluid pressure before the energization of the electrodes, a welding period during which current flows, a hold period during which the electrodes are deenergized but the fluid pressure maintained, and an off period during which the fluid pressure is released and the electrodes deenergized, said time delay means determining said period intervals independent of variations in the current and fluid pressure supplied to the system.

9. In a welder control system for electrically welding work by passing current through the work between electrodes pressed against the work by fluid pressure, means initiating the application of fluid pressure to said electrodes, means energizing said electrodes to pass current through the work a predetermined time interval after the initiation of the application of the fluid pressure, means deenergizing the electrodes to interrupt the passage of current through the work after it has flown for a second predetermined time interval, means releasing said fluid pressure after a third predetermined time interval, and time delay means determining said time intervals and operating independent of variations in the current and fluid pressure supplied to the system.

10. In a welder control system for electrically welding work by passing current therethrough between electrodes pressed against the work by fluid pressure, an electromagnetically operated valve controlling the application of fluid pressure to the electrodes, electromagnetically operated contactors controlling the passage of current through the work, and switching means effecting energization and deenergization of said valve and contactors in a predetermined cycle wherein the valve operates to initiate the application of fluid pressure, the contactors initiate the passage of current a predetermined time interval after the initiation of the fluid pressure, the contactors interrupt the current after a second predetermined time interval and the valve releases the fluid pressure after a third predetermined time interval, and time delay means controlling said switching means and determining said timing intervals independent of variations in the current and fluid pressure supplied to the system.

FRANK H. ROBY.